US011882849B2

(12) United States Patent
Cocchi et al.

(10) Patent No.: US 11,882,849 B2
(45) Date of Patent: Jan. 30, 2024

(54) THERMODYNAMIC SYSTEM, MACHINE COMPRISING THE THERMODYNAMIC SYSTEM AND THERMAL TREATMENT METHOD

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUUP S.R.L.—CARPIGIANI, Cernusco sul Naviglio (IT)

( * ) Notice: Subject to any disclaimer, the term of this patent is extended or adjusted under 35 U.S.C. 154(b) by 726 days.

(21) Appl. No.: 16/139,879

(22) Filed: Sep. 24, 2018

(65) Prior Publication Data

US 2019/0110496 A1 Apr. 18, 2019

(30) Foreign Application Priority Data

Oct. 17, 2017 (IT) .......................... 202017000117130

(51) Int. Cl.
| | |
|---|---|
| *A23G 3/02* | (2006.01) |
| *A23G 9/12* | (2006.01) |
| *A23G 9/16* | (2006.01) |
| *F25B 13/00* | (2006.01) |

(Continued)

(52) U.S. Cl.
CPC .............. *A23G 3/0226* (2013.01); *A23G 9/12* (2013.01); *A23G 9/16* (2013.01); *F25B 13/00* (2013.01);

(Continued)

(58) Field of Classification Search
CPC ........ F25B 13/00; F25B 31/008; F25B 49/02; F25B 2400/0409; F25B 2600/2501; A23G 3/0226; A23G 9/12; A23G 9/16
See application file for complete search history.

(56) References Cited

U.S. PATENT DOCUMENTS

| | | | |
|---|---|---|---|
| 6,330,805 | B1 | 12/2001 | Galian |
| 2003/0037553 | A1 | 2/2003 | Sulc et al. |

FOREIGN PATENT DOCUMENTS

| | | |
|---|---|---|
| CN | 200993509 Y | 12/2007 |
| CN | 101731428 A | 6/2010 |

(Continued)

OTHER PUBLICATIONS

Italian Search Report dated Jun. 4, 2018 for counterpart Italian Patent Application No. IT 102017000117130.

(Continued)

*Primary Examiner* — Marc E Norman
(74) *Attorney, Agent, or Firm* — SHUTTLEWORTH & INGERSOLL, PLC; Timothy J. Klima

(57) ABSTRACT

A thermodynamic system for cooling or heating at least a first container containing food products of the liquid or semi-liquid type, including a circuit employing a heat exchanger fluid, having at least:
- a compressor having at least one inlet for the heat exchanger fluid and one outlet for the heat exchanger fluid;
- a first heat exchanger connected to the outlet of the compressor;
- at least one first expansion element connected to an outlet of the first heat exchanger;
- a second heat exchanger which can be associated with the first container and which has an inlet connected to an outlet of the at least one first expansion element;
- a return duct having an inlet portion connected to an outlet of the second heat exchanger and an outlet portion connected to the inlet of the compressor.

19 Claims, 5 Drawing Sheets

(51) Int. Cl.
*F25B 31/00* (2006.01)
*F25B 41/22* (2021.01)
*F25B 49/02* (2006.01)
*F25B 41/37* (2021.01)

(52) U.S. Cl.
CPC ............ *F25B 31/008* (2013.01); *F25B 41/22* (2021.01); *F25B 41/37* (2021.01); *F25B 49/02* (2013.01); *F25B 2313/031* (2013.01); *F25B 2500/08* (2013.01); *F25B 2700/2101* (2013.01)

(56) References Cited

FOREIGN PATENT DOCUMENTS

| | | |
|---|---|---|
| CN | 102997514 A | 3/2013 |
| CN | 106595115 A | 4/2017 |
| CN | 206269436 U | 6/2017 |
| EP | 1039250 A2 | 9/2000 |
| EP | 3147601 A1 | 3/2017 |
| JP | 2000274838 A | 10/2000 |
| JP | 2016003815 A | 1/2016 |
| JP | 2016128743 A | 7/2016 |

OTHER PUBLICATIONS

Chinese Office Action dated Jun. 10, 2021 from counterpart Chinese Patent Application No. 201811202305.5.
Chinese Office Action dated Dec. 17, 2021 from counterpart Chinese Patent Application No. 201811202305.5 (English translation only).
Japanese Office Action dated Jun. 15, 2022 from counterpart Japanese Patent Application No. 2018190572.

THERMODYNAMIC SYSTEM, MACHINE COMPRISING THE THERMODYNAMIC SYSTEM AND THERMAL TREATMENT METHOD

This application claims priority to Italian Patent Application 102017000117130 filed Oct. 17, 2017, the entirety of which is incorporated by reference herein.

BACKGROUND OF THE INVENTION

This invention addresses the field of machines for making liquid or semi-liquid food products.

More specifically, this invention relates to a thermodynamic system, a machine for making liquid and semi-liquid products, comprising the system, and a thermal treatment method.

In the sector of machines for making liquid and semi-liquid products such as ice creams, cake and pastry fillings and the like, it is standard practice to thermally treat a product (by heating and/or cooling) in order to make a predetermined recipe.

Known in the prior art are a plurality of thermal systems of thermodynamic type which allow a product to be thermally treated (heated or cooled) in a container in order to modify its food/organoleptic properties.

Most thermodynamic systems for cooling are based on the inverse Carnot cycle (also known as saturated vapor compression cycle): these systems allow a container to be cooled by means of a thermodynamic circuit operating on a heat exchanger fluid and comprise a pair of exchangers (evaporator and condenser), a compressor and a throttle element, with the heat exchanger fluid flowing through all of them.

Generally speaking, these systems use compressors of the type known as "sealed" compressors, consisting of a casing which encloses the electric motor and the compression parts acting on the refrigerant fluid.

More precisely, a compressor of this type typically has a containment casing which is sealed by welding, preventing access to all the parts inside it for repair or replacement purposes. In particular, the motor which allows the fluid to be compressed is housed inside the casing and thus exposed to direct contact with the flow of refrigerant fluid in the intake cavity.

Exposure of the motor in general, and of the winding in particular, as well as of the motor oil, to the physical temperature and pressure conditions created by the inflowing heat exchanger fluid constitutes an evident drawback in the operation of the compressor and a limitation on the size of the system, especially if the thermodynamic system can operate according to what is known as a hot gas cycle, where the compressor, in practice, acts as a heating element for heating the heat exchanger fluid.

Exposing the compressor to a particularly hot heat exchanger fluid significantly reduces the working life of the compressor (affecting both the mechanical and electrical components, including the compressor oil).

In effect, during operation of the system, the temperature inside the compressor increases, and at times quite considerably, rising to as much as 130° C. and over, causing rapid wear and reducing the working life of the components, in particular of the electric motor and oil.

SUMMARY OF THE INVENTION

In this context, the technical purpose which forms the basis of the present invention is to propose a thermodynamic system which overcomes the above mentioned disadvantages of the prior art.

In particular, this invention has for an aim to provide a thermodynamic system which allows thermally treating a liquid or semi-liquid food product and which can guarantee operation under optimum conditions in order to reduce wear and maximize the working life (in particular of the compressor).

The technical purpose indicated and the aims specified are substantially achieved by a thermodynamic system comprising the technical features described in one or more of the appended claims and by a method for thermally treating a liquid or semi-liquid food product.

Another object of this invention is a machine for making liquid or semi-liquid food products.

Another object of this invention is a method for thermally treating a liquid or semi-liquid food product according to the appended claims.

BRIEF DESCRIPTION OF THE DRAWINGS

Further features and advantages of the invention are more apparent in the detailed description below, with reference to a preferred, non-limiting, embodiment of a thermodynamic system as illustrated in the accompanying drawings, in which.

DESCRIPTION OF THE PREFERRED EMBODIMENTS

Figure 1:
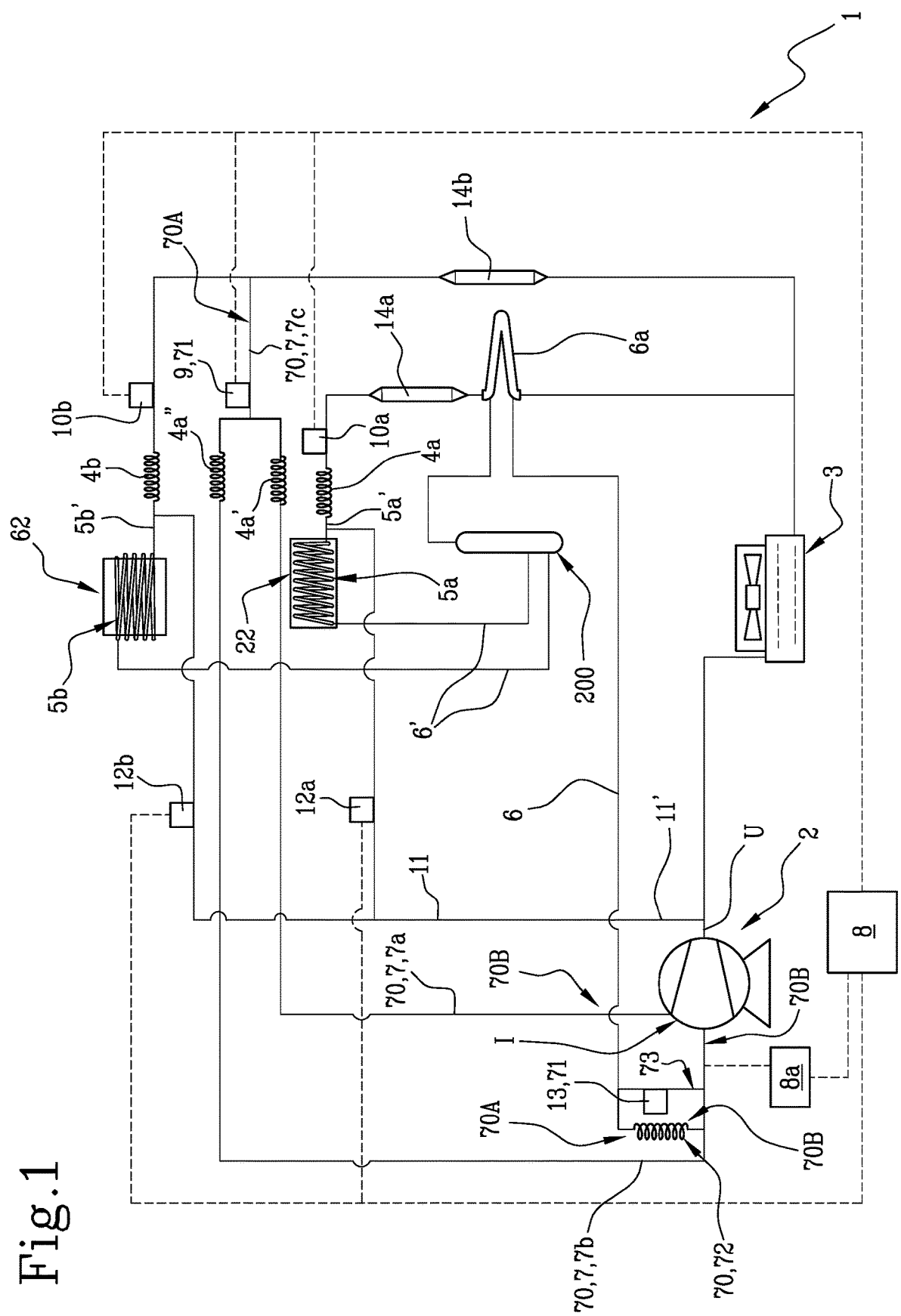
FIG. 1 schematically illustrates a first possible embodiment of a thermodynamic system according to this invention.

The numeral 1 in FIGS. 1-4 denotes a thermodynamic system according to this invention.

The thermodynamic system 1 is applicable to a machine 20 for thermally treating liquid or semi-liquid food products, either hot or cold, such as, for example, gelato, soft ice cream, yogurt, chocolate, sorbets, savory soups.

More specifically, this invention relates to a thermodynamic system 1 for cooling or heating at least a first container 22 containing food products of the liquid or semi-liquid type.

According to the invention, the thermodynamic system for cooling or heating at least a first container 22 containing food products of the liquid or semi-liquid type, comprises a circuit employing a heat exchanger fluid and having at least:

a compressor 2 having at least one inlet I for the heat exchanger fluid and one outlet U for the heat exchanger fluid;

a first heat exchanger 3 connected to the outlet U of the compressor 2;

at least one first expansion element 4a (more generally speaking expansion means or member 4a) connected to the outlet of the first heat exchanger 3;

a second heat exchanger 5*a* which can be associated with the first container 22 and which has an inlet 5*a*' connected to the outlet of the at least one first expansion element 4*a*;

a return duct 6 having an inlet portion 6' connected to an outlet of the second heat exchanger 5*a* and an outlet portion connected to the inlet I of the compressor 2.

It should be noted that the first container 22 may be a container of any kind, such as a cylinder, a tub, etc.

According to the invention, the system 1 also comprises a device 70 for reducing the temperature of the heat exchanger fluid, associated with the circuit for receiving at least a portion of the heat exchanger fluid, having an inlet 70A and an outlet 70B and configured to reduce the temperature of the heat exchanger fluid flowing between its inlet 70A and its outlet 70B, the outlet 70B being connected in proximity to the heat exchanger fluid inlet I of the compressor 2 or inside the compressor 2.

The system 1 preferably also comprises means 71 for regulating the flow of the heat exchanger fluid traversing the temperature reducing device 70, acting on the flow of the heat exchanger fluid in transit through the device 70 for reducing the temperature of the heat exchanger fluid between a minimum flow configuration (which may be zero or a value greater than zero) and a maximum flow configuration (a value greater than zero).

The system 1 preferably further comprises a controller (control and drive unit) 8 operating on the flow regulating means 71 in order to drive them (to regulate the flow between the minimum flow and the maximum flow configuration). The controller 8 may comprise hardware, including a processor, and software to run on the processor, as would be known.

Preferably, the minimum flow is zero, that is to say, when the means 71 for regulating the flow of the heat exchanger fluid traversing the temperature reducing device 70 are set to the minimum flow configuration, the flow traversing the temperature reducing device 70 is zero (no flow).

Under these conditions, therefore, the means 71 for regulating the flow through the temperature reducing device 70 allow turning the flow of fluid through the temperature reducing device 70 ON and OFF (on an "all or nothing" basis).

Described below are some modes of implementing the temperature reducing device 70, which are all shown together in FIG. 1, it being understood, however, that each implementation mode can be used individually (without necessarily being combined or coupled with the others).

Figure 2:
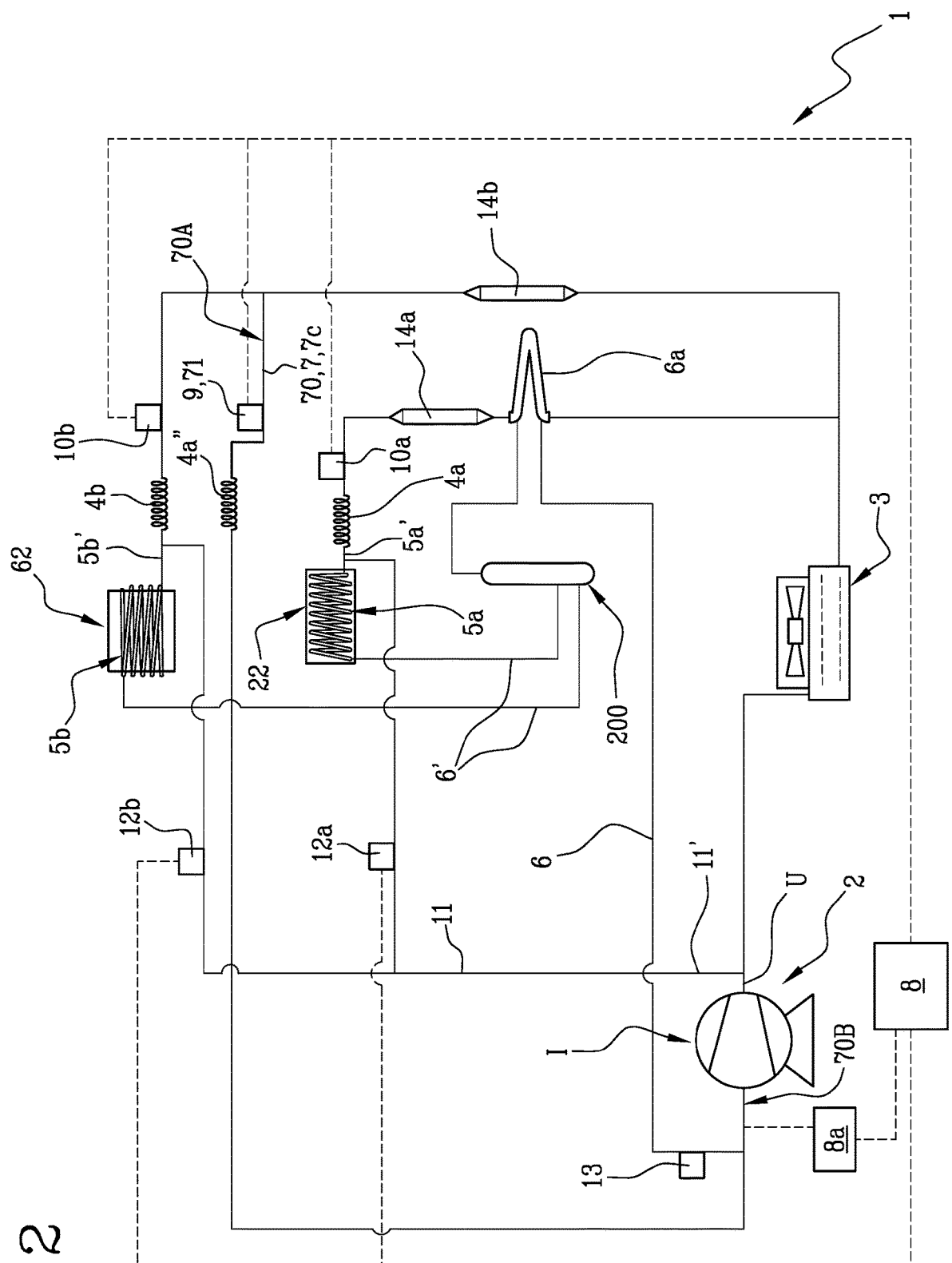
FIG. 2 schematically illustrates a second possible embodiment of a thermodynamic system according to this invention.
Figure 3:
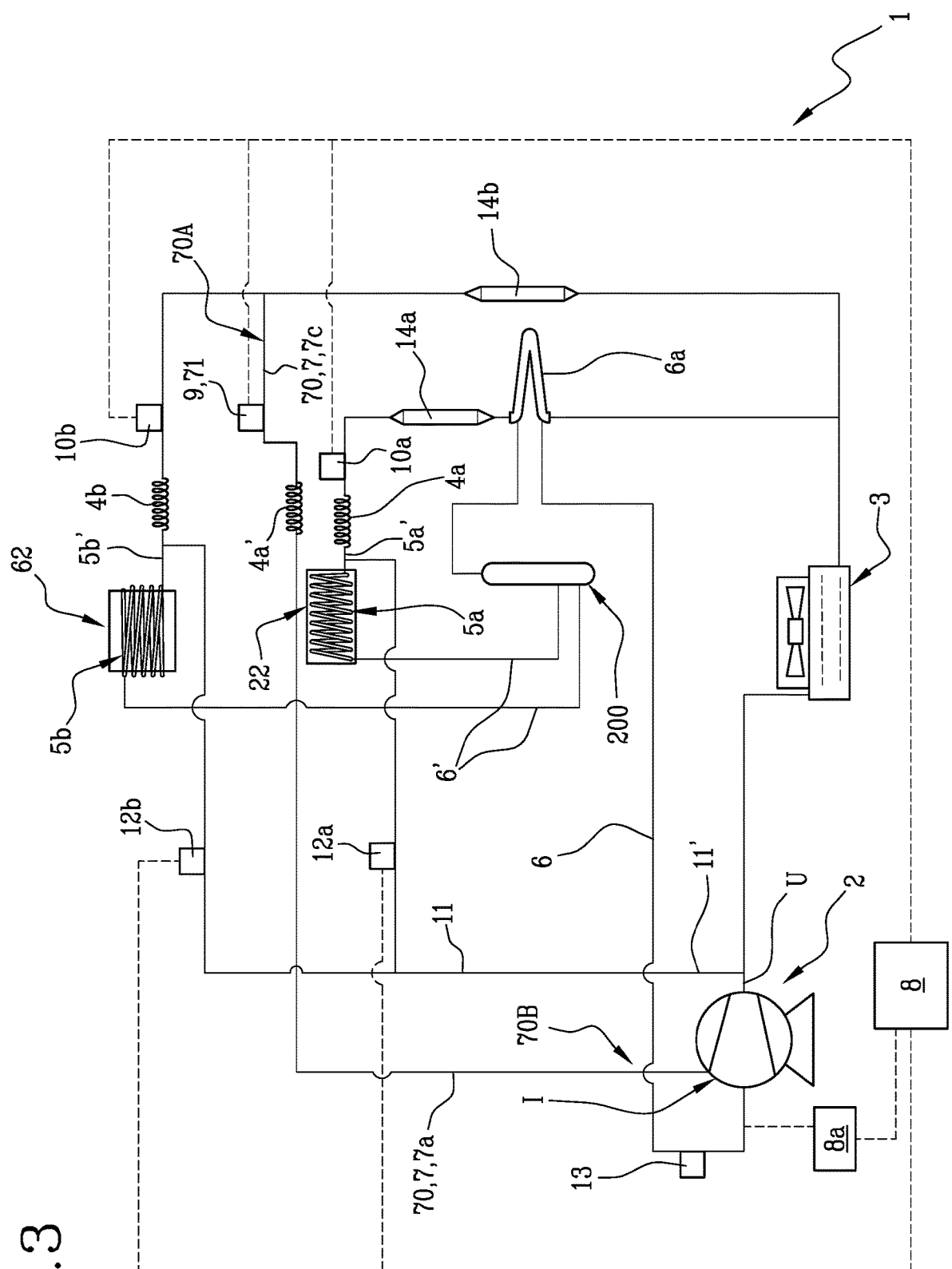
FIG. 3 schematically illustrates a third possible embodiment of a thermodynamic system according to this invention.
Figure 4:
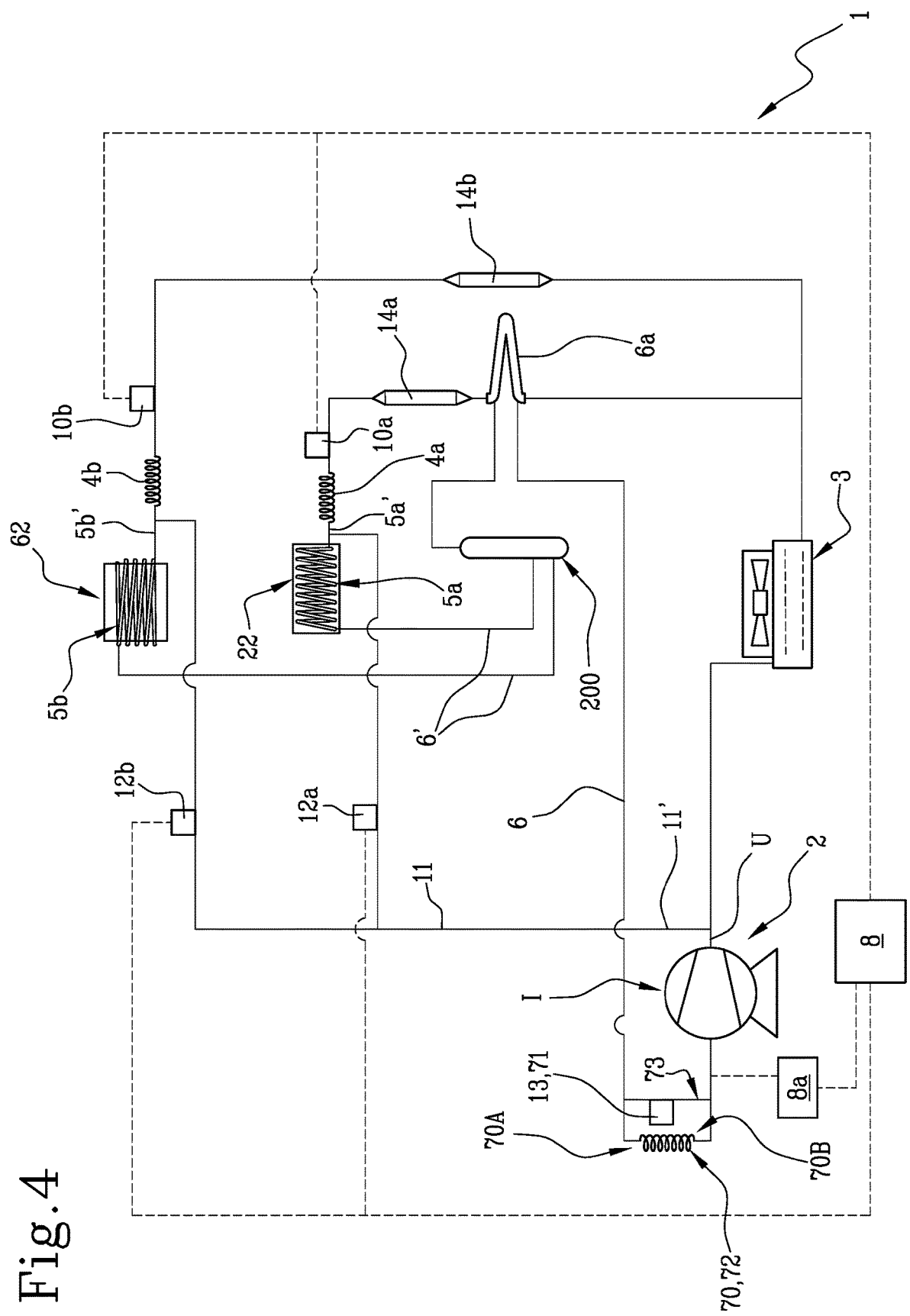
FIG. 4 schematically illustrates a fourth possible embodiment of a thermodynamic system according to this invention.
Figure 5:
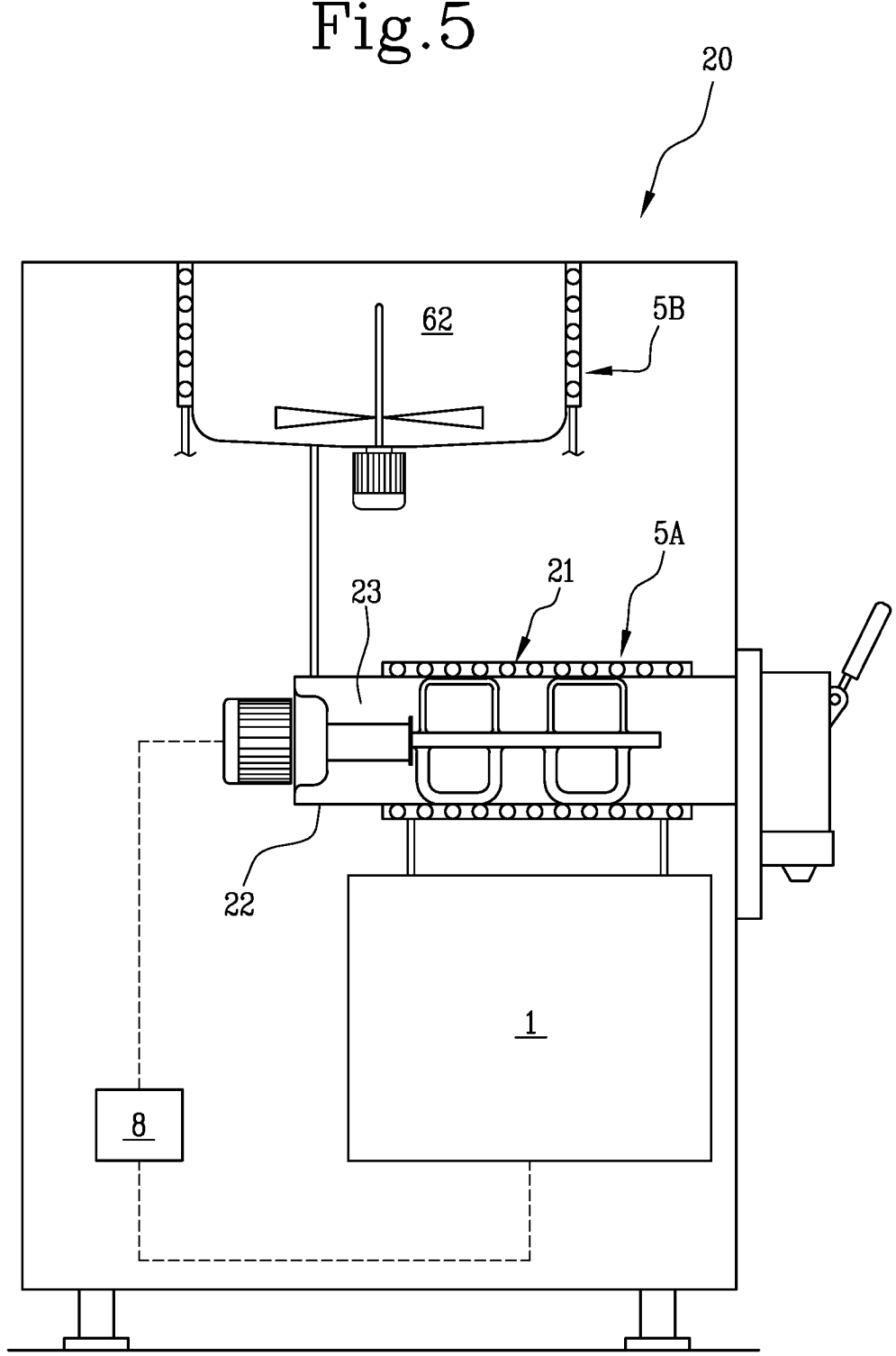
FIG. 5 is a schematic view of a machine for making liquid or semi-liquid products and to which the thermodynamic system illustrated in the preceding figures can be applied.

In this regard, FIGS. 2 to 4 each illustrate a mode of implementing the temperature reducing device 70 individually.

According to one aspect, the circuit employing a heat exchanger fluid is configured to be switched between a configuration for carrying out a hot gas thermodynamic cycle for heating the first container 22 and a thermodynamic, inverse Carnot cycle (saturated vapor compression cycle) for cooling the first container 22.

In practice, the thermal system of FIG. 1 is reversible, since it can operate in a first configuration (hot gas) to heat the first container 22, and in a second configuration (vapor compression cycle) to cool the first container 22.

According to one aspect, the thermal system 1 also comprises:

a duct 11 for carrying out a hot-gas thermodynamic cycle and having an inlet portion 11' connectable to an outlet U of the compressor 2 to receive the heat exchanger fluid and an outlet portion connectable to the inlet of the second heat exchanger 5*a*, at least one selective closing element (12*a*, 12*b*) operatively associated with the duct 11 for carrying out a hot-gas thermodynamic cycle and configured to close or open the duct 11 so as to inhibit or enable the heat exchanger fluid to circulate inside it, and wherein the control and drive unit 8 is configured to act on the selective closing element (12*a*, 12*b*) to drive it between a duct 11 closed configuration and a duct 11 open configuration.

It should be noted that the presence of the duct 11 makes it possible to implement the hot gas cycle and the presence of the selective closing element (12*a*, 12*b*) makes it possible to enable this (hot gas) mode of operation of the thermodynamic system.

More precisely, when the duct 11 is closed, the hot gas operating mode is on.

Described below is a first mode of implementing the device 70 for reducing the temperature of the heat exchanger fluid flowing into the compressor 2. This is shown in FIG. 1 and, as stated above, might also be implemented individually in the thermal system (which, in such a case, might be without one or more of the branches 7*a*, 7*b* and 7*c*).

This first embodiment is illustrated individually in FIG. 4.

In this embodiment, the device 70 for reducing the temperature of the heat exchanger fluid comprises a pressure reducing element 72 (or an expansion element 72) and the means 71 for regulating the flow in the temperature reducing device 70 comprise a valve 13 acting on a branch 73 of the circuit parallel to the pressure reducing element 72 to close or open the branch 73 of the circuit parallel to the pressure reducing element 72.

It should be noted that the pressure reducing element 72 is preferably a throttle element (for example, a capillary or a narrow section tubular device).

The pressure reducing element 72 is disposed along the return duct 6, upstream of the compressor 2.

Similarly, the valve 13, acting on a branch 73 of the circuit which is connected in parallel to the pressure reducing element 72, is disposed along the return duct 6, upstream of the compressor 2.

It should be noted that when the valve 13 is in the open configuration, most of the heat exchanger fluid flows through the branch 73, because the load loss in the branch 73 is less than that in the pressure reducing element 72.

It follows that when the valve 13 is in the closed configuration, the heat exchanger fluid flowing along the return duct 6 flows through the pressure reducing element 72 because it is prevented from flowing through the branch 73.

Thus, if the system 1 is operating on a hot gas thermodynamic cycle, the valve 13 can be closed to allow cooling the heat exchanger fluid flowing into the compressor 2. Closing the valve 13 causes part of the heat exchanger fluid flowing through the pressure reducing element 72 to expand and cool so that when it reaches the inlet I of the compressor 2, it is at a low temperature (certainly lower than that of the components of the compressor 2).

It is thus possible to run the compressor 2 on a cooling cycle by closing the valve 13.

According to this aspect, the control and drive unit 8 is configured to drive the valve 13 into a configuration for closing the branch 73 of the circuit parallel to the pressure reducing element 72 to cool the compressor 2.

It should also be noted that for the purposes of this disclosure, turning a valve on or off means that the drive and control unit 8 is configured to operate on the valve in such a way as to cause it to be opened or closed.

A second mode of implementing the temperature reducing device 70, also represented in FIG. 1, as well as in FIGS. 2 and 3, is now described below.

It should be noted that this mode of implementing the temperature reducing device 70 might also be implemented individually (as shown in FIGS. 2 and 3), that is to say, without the first embodiment, although FIG. 1 shows it in combination with the first embodiment.

According to this implementation mode, the temperature reducing device 70 comprises a bypass duct 7 which has an inlet portion connected to an outlet of the first heat exchanger 3 to receive the heat exchanger fluid from the first heat exchanger 3 and at least one outlet portion 7a, 7b connected to the heat exchanger fluid inlet I of the compressor 2 or (directly) inside the compressor 2.

In practice, the bypass duct 7 connects the outlet of the first exchanger 3 to the inlet I of the compressor.

The bypass duct 7 preferably accommodates an expansion element 4a′ adapted to allow the fluid to expand.

The means 71 for regulating the flow through the temperature reducing device 70 comprise a valve 9. The valve 9 is adapted to close or open the bypass duct 7 to enable or inhibit the circulation of the fluid in the duct.

According to another aspect, the bypass duct 7 has a first (outlet) portion 7a connected inside the compressor 2 to release at least a portion of the heat exchanger fluid flowing out of the bypass duct 7 inside the compressor 2 and a second outlet portion 7b connected to an end portion of the return duct 6 to release a portion of the heat exchanger fluid flowing out of the bypass duct 7 at the heat exchanger fluid inlet I of the compressor 2.

It should be noted that the portions 7a and 7b of the bypass duct 7 are disposed substantially in parallel, that is to say, they define two parallel branches of the bypass duct 7.

In practice, the bypass duct 7 allows the heat exchanger fluid in transit through it to be released at two points: into the return duct 6 at the inlet I of the compressor 2; and directly inside the compressor 2.

The heat exchanger fluid released by the bypass duct 7 may be a vapor (having a liquid component) or a liquid. Preferably, the heat exchanger fluid is a (saturated) vapor.

It should be noted that injecting a fluid at a low temperature through the bypass duct 7 at the inlet and/or directly into the compressor 2 causes the compressor to cool: in effect, the fluid from the bypass duct 7 removes heat from the components of the compressor 2.

Cooling in this way is particularly advantageous when the system is operating on a hot gas cycle, where the compressor 2 is subjected to strong thermal stress.

In a particularly advantageous manner, as will become clearer as this description continues, the bypass duct 7 allows conveying and releasing fluid at a low temperature to the compressor 2 so that the fluid can remove heat from the components of the compressor 2.

As explained in more detail below, thanks to the innovation of the bypass branch 7, the temperature of the components of the compressor 2 remains limited at all times, preferably less than 100° C. (even in the case of use on a hot gas cycle).

The bypass duct 7 can be turned on and/or off to cool the compressor 2 both during operation of the system on the hot gas thermodynamic cycle and during operation of the system on the saturated vapor thermodynamic cycle (inverse Carnot cycle).

The bypass duct 7 is configured to withdraw at least a portion of the heat exchanger fluid (in the liquid state at high pressure) flowing out of the heat exchanger 3 and to convey it into the inlet "I" of the compressor 2 (after reducing the pressure/temperature accordingly) and/or into an intake cavity of the compressor 2. The heat exchanger fluid (thanks to its relatively low temperature) absorbs thermal energy from the hotter components of the compressor 2, thereby reducing the temperature of the compressor 2, that is to say, cooling it.

This advantageously reduces the thermal stress the compressor 2 is subjected to, thus increasing its working life accordingly.

To allow correct functioning of the compressor 2, the bypass duct 7 has, at an inlet portion of it, at least one expansion element 4a′ which enables the heat exchanger fluid to expand in such a way as to reduce its temperature so as to allow it to carry out a process for cooling the compressor 2.

More specifically, the bypass duct 7 has an inlet portion 7c.

The inlet portion 7c is connected to an outlet of the first heat exchanger 3 to receive the heat exchanger fluid.

The outlet portion 7a is connected directly to the inside of the compressor 2, more precisely to an (intake) cavity inside the compressor 2.

The portion 7b of the bypass duct 7 is associated with a respective additional expansion element 4a″ and is connected to an (end) portion of the return duct 6, where the heat exchanger fluid flows into the compressor 2.

Thanks to the portion 7b of the bypass duct 7, the (cool) heat exchanger fluid can be conveyed to the intake flow of the compressor 2, so as to also optimally cool the inlet portions of the compressor 2.

According to another aspect, the bypass valve 9 disposed in the bypass duct 7 is connected to the drive and control unit 8 so that it can be turned on or off to open or close the bypass duct 7 in order to vary the flow of heat exchanger fluid in the bypass duct 7.

Preferably, the bypass valve 9 is driven to fully close or fully open the bypass duct 7, thereby inhibiting or enabling circulation of the heat exchanger fluid in the bypass duct 7.

It should be noted therefore that the flow rate of the heat exchanger fluid in the bypass duct 7 can be increased, to cool the compressor 2, either during operation of the system on the hot gas cycle or during operation of the system on the vapor compression cycle (inverse Carnot cycle).

More specifically, the bypass duct 7 can be opened, to allow the heat exchanger fluid to circulate in the duct so as to cool the compressor, either during operation of the system on the hot gas cycle or during operation of the system on the vapor compression cycle (inverse Carnot cycle).

It should be noted that in the bypass duct 7, the heat exchanger fluid undergoes expansion (thanks to an expansion element 4a′ and an additional expansion element 4a″) which reduces its temperature and allows it reach the compressor 2 at an optimum temperature for cooling.

It should be noted that the bypass duct 7 might comprise only the first outlet portion 7a or only the second outlet portion 7b or both, as illustrated in FIG. 1.

Advantageously, the bypass duct may be open to cool the compressor both during operation of the thermodynamic system on a hot gas cycle (where the product inside the container 22 is heated) and during operation of the system on what is known as a vapor compression thermodynamic cycle (where it is cooled).

In practice, advantageously, injecting the fluid at a low temperature into the inlet or into the inside of the compressor 2 causes the fluid to remove heat from the compressor 2.

Described below are some aspects common to all the embodiments of the temperature reducing device 70.

According to one aspect, the drive and control unit 8 comprises a measuring device 8a adapted to detect a triggering parameter, the drive and control unit 8 being configured to regulate the means 71 for regulating the flow of heat exchanger fluid traversing the temperature reducing device 70 as a function of the value of the triggering parameter captured by the measuring device 8a.

The triggering parameter may be any physical quantity (pressure, temperature) or combination of physical quantities.

If the measuring device 8a of the drive and control unit 8 detects that a certain triggering parameter has been reached or exceeded, the control and drive unit 8 turns on the bypass valve 9 (driving it to the open configuration), thereby allowing a bypass cycle to be started, which may be performed simultaneously with, or alternatively to, the thermodynamic cycle in progress (hot gas cycle or inverse Carnot cycle).

According to another aspect, the measuring device 8a comprises a temperature sensor and the triggering parameter is a temperature value detected near the compressor 2 or inside the compressor 2.

Preferably, according to this aspect, the bypass branch 7 is opened, or more generally speaking, the flow in the bypass branch 7 is set to a maximum value, based on the temperature detected by the temperature sensor.

According to a non-limiting aspect, if the temperature is greater than a first threshold, the bypass branch 7 is opened, if it is less than a second threshold (which may or may not coincide with the first) the bypass branch 7 is closed.

According to another aspect, the measuring device 8a comprises a temperature sensor and the triggering parameter is a value of the temperature of the heat exchanger fluid at the outlet portion of the return duct 6 connected to the inlet I of the compressor 2.

According to another aspect, the measuring device 8a is a timer and the triggering parameter comprises a time interval.

According to this aspect, the measuring device 8a is a timer and the triggering parameter is a time interval or a time slot, that is, a predetermined period of time depending on the operating needs of the thermodynamic system 1.

The above allows automating the opening and closing of the bypass duct 7.

Described below are other aspects, with reference to the accompanying drawings.

According to one aspect, the system comprises a first cooling valve 10a interposed between the second heat exchanger 5a and the first heat exchanger 3 and connected to the drive and control unit 8 so that it can be turned on or off to open or close the inlet portion 5a' of the second heat exchanger 5a to allow performing a thermodynamic, inverse Carnot cycle.

It should be noted that the first cooling valve 10a is turned on (in the open configuration) when the (product inside the) container 22 needs to be cooled: in effect, opening the first cooling valve 10a causes a thermodynamic inverse Carnot cycle to be carried out between the compressor 2, the first exchanger 3, the pressure reducing element 4a and the second exchanger 5a (this cycle also involves the return duct 6).

According to another aspect, the at least one selective closing element (12a, 12b), operatively associated with the duct 11 for carrying out a hot-gas thermodynamic cycle, comprises a first heating valve 12a disposed downstream of the compressor 2 and connected to the drive and control unit 8 so that it can be turned on or off to open or close the outlet portion of the hot-gas duct 11 connectable to the inlet of the second heat exchanger 5a.

In practice, opening the first heating valve 12a causes a hot gas thermodynamic cycle to be carried out which involves the compressor 2 and the second exchanger 5a (this cycle also involves the return duct 6).

According to another aspect, the circuit further comprises a third heat exchanger 5b which can be associated with at least one second container 62 for containing a liquid or semi-liquid product, the third heat exchanger 5b being disposed substantially parallel to the second heat exchanger 5a between the first heat exchanger 3 and the compressor 2.

It is stressed that the third heat exchanger 5b and the second container 62 (where the first container is the container 22) are optional.

Advantageously, the presence of two or more heat exchangers 5a, 5b which can be associated with respective containers, allows carrying out different processes on different products using cycles with special temperature requirements simultaneously, or performing a succession of process steps on the same product requiring different process temperatures, using a single thermodynamic system 1.

According to another aspect, the system comprises at least one second expansion element 4b disposed at the outlet of the first heat exchanger 3, and the third heat exchanger 5b has an inlet portion 5b' connected to an outlet of the at least one second expansion element 4b.

According to another aspect, the system comprises a second cooling valve 10b interposed between the third heat exchanger 5b and the first heat exchanger 3.

It should be noted that the second cooling valve 10b is turned on (in the open configuration) when the (product inside the) second container 62 needs to be cooled: in effect, opening the second cooling valve 10b causes a thermodynamic inverse Carnot cycle to be carried out between the compressor 2, the first exchanger 3, the second pressure reducing element (second expansion element) 4b and the third exchanger 5b (this cycle also involves the return duct 6).

According to another aspect, the at least one selective closing element (12b, 12b) comprises a second heating valve 12b disposed downstream of the compressor 2 and connected to the drive and control unit 8 so that it can be turned on or off to open or close the outlet portion of the hot-gas duct 11 connectable to the inlet of the third heat exchanger 5b.

In practice, opening the second heating valve 12b causes a hot gas thermodynamic cycle to be carried out which involves the compressor 2 and the third exchanger 5b (this cycle also involves the return duct 6); the purpose of this cycle is to release heat to the third exchanger 5b.

Described below are further aspects and details of the system 1.

It should be noted that the return duct 6 has, along its path, a heat exchanger 6a configured to define a heat exchange portion (in the absence of mixing) between two (countercurrent) flows of heat exchanger fluid flowing through them.

More precisely, a first flow travels along the return duct 6 (from the second exchanger 5a to the compressor 2) and a second flow travels from the heat exchanger 3 to the second exchanger 5a (and also towards the first expansion element 4a).

In other words, the heat exchanger fluid (at a higher temperature) flowing out of the first heat exchanger 3, before passing through the first expansion element 4a, exchanges heat with a flow of heat exchanger fluid flowing out of the second heat exchanger 5a, and thus at a lower temperature than the flow of heat exchanger fluid flowing out of the first heat exchanger 3.

The presence of the heat exchange portion allows an intermediate heat exchange to be carried out in such a way that a flow of heat exchanger fluid flowing out of the first heat exchanger 3 comes into contact with a fluid which is cooler and thus undergoes an initial cooling process.

The overall efficiency of the thermodynamic system 1 can thus be improved by starting to cool the heat exchanger fluid before it enters the first expansion element 4a. This is particularly important where the container 22 is a container intended for processing iced products, such as ice cream, or the like.

In a preferred embodiment, the thermodynamic system 1 also comprises filters 14a, 14b which allow the heat exchanger fluid to be kept clean by removing any impurities which may have accumulated in the fluid during the cooling or heating cycles, especially when it flows through the compressor 2.

As shown in detail in FIG. 1, a first filter 14a is disposed downstream of the first heat exchanger 3 and upstream both of the first cooling valve 10a and of the bypass valve 9.

Similarly, the second filter 14b is disposed downstream of the first heat exchanger 3 and upstream of the second cooling valve 10b.

Described below for the sake of completeness is the operation of the thermodynamic system when it operates on a vapor compression cycle (inverse Carnot cycle), with reference to the container 22.

The heat exchanger fluid is compressed in the compressor 2 which causes its pressure to increase.

The compressed heat exchanger fluid then reaches the first heat exchanger 3, in this case acting as a condenser, which allows an exchange of thermal energy between the outside atmosphere and the (heated) heat exchanger fluid.

The heat exchanger fluid, by flowing into the first heat exchanger 3, is thus cooled and condenses, passing from gas to liquid state.

Thus, the fluid flowing out of the exchanger 3 is a liquid at high pressure.

Downstream of the first heat exchanger 3, the heat exchanger fluid in the liquid state flows through the expansion element 4a (or, more generally speaking, a pressure reducing element 4a) which consists for example of a throttle valve, the expansion element 4a allowing expanding—lowering the pressure of—the heat exchanger fluid (thus bringing it to a lower temperature).

Lastly, the heat exchanger fluid flows through the second heat exchanger 5a which, in this case, acts as an evaporator; inside the second heat exchanger 5a, the heat exchanger fluid, by passing from liquid to vapor state, absorbs thermal energy, hence heat, for example from the container 22 which the second heat exchanger 5a is associated with (that is, from the product inside the container 22).

In the second heat exchanger 5a, the heat exchanger fluid passes from the liquid to the vapor state.

After the second heat exchanger 5a, the heat exchanger fluid flows through an element, labelled 200, which is a liquid—vapor phase separator.

Downstream of the phase separator 200, still along the return duct 6, the heat exchanger fluid is made to flow through the exchanger labelled 6a, where it exchanges heat with a flow of heat exchanger fluid directed from the first heat exchanger 3 to the second heat exchanger 5a.

At this point, the heat exchanger fluid flows right through the return duct 6 to reach the valve 13 and the branch 73, the branch 73 being that which the heat exchanger fluid flows through if the valve 13 is in the open configuration.

If the valve 13 is in the closed configuration, the heat exchanger fluid flows through the element 72 and not through the branch 73.

Similarly, if the machine 20 has a second container 62 and a third exchanger 5b associated therewith, what is described above with reference to the flow of heat exchanger fluid through the first expansion element 4a, through the second exchanger 5a, through the heater 200 and the heat exchanger 6a, is also performed on a portion of the flow of heat exchanger fluid flowing out of the first heat exchanger 3 and directed towards the third heat exchanger 5b.

The thermodynamic cycle described above is the one relating to the case where the exchangers 5a and 5b are used to cool the product by means of a thermodynamic inverse Carnot cycle.

On the other hand, if both exchangers 5a and 5b need to be used to heat the product by means of a hot gas cycle, the valves 10a and 10b are closed, whilst the valves 12a and 12b are open.

In such a case, circulating the heat exchanger fluid in the gas state in the compressor 2 causes the heat exchanger fluid in the gas state to be heated in the compressor 2 and to then release heat in the exchangers 5a and 5b.

Also defined according to the invention is a machine 20 for making liquid or semi-liquid food products and which comprises, in combination:

- a processing unit 21 for making a liquid or semi-liquid food product, comprising at least one container 22 and a stirrer 23 mounted inside the at least one container 22; to rotate inside the container 22;
- a thermodynamic system according to any one of the appended claims, operatively associated with the processing unit 21, the second heat exchanger 5a being associated with the at least one container 22 to exchange heat with the product contained in the at least one container 22.

According to another aspect, the machine is a machine for making ice cream and the processing unit 21 is a batch freezing unit.

According to yet another aspect, the machine comprises a second container 62 and a third heat exchanger 5b associated with the second container 62 to exchange heat with the product contained in the second container 62, the third heat exchanger 5b forming part of the circuit of the thermodynamic system according to any one of the appended claims.

It should be stressed that according to the invention, the thermodynamic system might be applied to any kind of machine designed to thermally treat liquid or semi-liquid products.

More precisely, in the machine of FIG. 1 (depending on whether the valves are open or closed), the product might be treated only in the first container 22 or only in the second container 62 or simultaneously in both the first container 22 and the second container 62.

It should be noted that, more generally speaking, the machine 1 might comprise a single container (22 or 62); in such a case, the thermodynamic system would comprise only one between the second heat exchanger 5a and the third heat exchanger 5b and only one between the pressure reducing element (expansion element) 4a and 4b and only one between the valve 10a and 10b and only one between the valve 12a and 12b.

Also defined according to the invention is a method for thermally treating a liquid or semi-liquid product, comprising the steps of:
A) preparing a machine 20 for making liquid or semi-liquid food products according to any one of the appended claims and placing a liquid or semi-liquid product inside the at least one first container (22);
B) turning on the compressor 2 to convey the heat exchanger fluid along the circuit of the thermodynamic system of the machine to perform a thermodynamic cycle for releasing heat (hot gas thermodynamic cycle) or absorbing heat (vapor compression thermodynamic cycle) to or from the liquid or semi-liquid product inside the at least one container (22);
C) regulating a flow in the temperature reducing device 70 to a value greater than zero in order to cool the compressor 2.

According to another aspect, the step C) of regulating (setting) a flow in the temperature reducing device 70 to a value greater than zero in order to cool the compressor 2 comprises opening the bypass duct 7 to convey and release at least part of the heat exchanger fluid from the first heat exchanger 3 to a heat exchanger fluid inlet I of the compressor 2 or directly inside the compressor 2 so as to cool the compressor 2.

According to another aspect, the step B) of conveying the heat exchanger fluid along the circuit of the thermodynamic system of the machine to perform a thermodynamic cycle includes performing a thermodynamic, inverse Carnot cycle wherein the heat exchanger fluid draws heat from the product contained in the at least one container 22.

According to another aspect, the step B) of conveying the heat exchanger fluid along the circuit of the thermodynamic system of the machine to perform a thermodynamic cycle includes performing a thermodynamic, hot gas cycle wherein the heat exchanger fluid releases heat to the product contained in the at least one container 22.

According to yet another aspect, the method comprises a step of acquiring a triggering parameter and the step C) of regulating a flow in the temperature reducing device 70 to a value greater than zero in order to cool the compressor 2 is performed as a function of the value of the triggering parameter.

Preferably, the triggering parameter is at least one of the following: a time interval, a temperature value of the compressor 2 of the thermodynamic system 1 or a temperature value of the heat exchanger fluid flowing into the compressor 2.

Advantageously, the thermodynamic system 1 according to this invention allows overcoming the aforementioned drawbacks of the prior art in that it provides an efficient and effective way of reducing the temperature of certain components of the thermodynamic system 1 (more precisely, of the compressor), in use.

Advantageously, thanks to the method and system of the invention, the temperature of the compressor can be limited to a particularly low level, in particular during operation of the thermodynamic system on what is known as a hot gas cycle.

This advantageously reduces compressor wear and increases the reliability and efficiency of the thermodynamic cycle.

What is claimed is:

1. A thermodynamic system for cooling or heating a first container containing a liquid or semi-liquid food product, comprising a circuit employing a heat exchanger fluid, including:
   a compressor including a compressor inlet for the heat exchanger fluid and a compressor outlet for the heat exchanger fluid;
   a first heat exchanger, having an outlet and an inlet, the inlet connected to the compressor outlet;
   a first expansion element connected to the outlet of the first heat exchanger;
   a second heat exchanger thermally connectable with the first container and which has an outlet and an inlet connected to an outlet of the first expansion element;
   a return duct including an inlet portion connected to the outlet of the second heat exchanger and an outlet portion connected to the compressor inlet;
   a temperature reducing device configured for reducing a temperature of the heat exchanger fluid, connectable with the circuit for receiving at least a portion of the heat exchanger fluid, including a device inlet and a device outlet, and configured to reduce the temperature of the heat exchanger fluid flowing between the device inlet and the device outlet, the device outlet being flowingly connected to the compressor inlet or inside the compressor;
   a regulating valve configured for regulating the flow of the heat exchanger fluid traversing the temperature reducing device between a minimum flow configuration and a maximum flow configuration;
   a controller operating on the regulating valve to drive the regulating valve;
   wherein the controller includes a measuring device adapted to detect a triggering parameter, the controller being configured to control the regulating valve for regulating the flow of heat exchanger fluid traversing the temperature reducing device as a function of a value of the triggering parameter.

2. The thermodynamic system according to claim 1, wherein the circuit is configured to be switched between a configuration for carrying out a hot gas thermodynamic cycle for heating the first container and a thermodynamic, inverse Carnot cycle for cooling the first container.

3. The thermodynamic system according to claim 1, and further comprising:
   a hot gas duct for carrying out a hot-gas thermodynamic cycle and having an inlet portion connectable to the compressor outlet to receive the heat exchanger fluid and an outlet portion connectable to the inlet of the second heat exchanger,
   a selective closing element operatively connected with the hot gas duct and configured to close or open the hot gas duct so as to inhibit or enable the heat exchanger fluid to circulate inside the hot gas duct, and wherein the controller is configured to act on the selective closing element to drive the selective closing element between a hot gas duct closed configuration and a hot gas duct open configuration.

4. The thermodynamic system according to claim 3, wherein the selective closing element comprises a first heating valve disposed downstream of the compressor and connected to the controller so that the first heating valve is movable between open and closed positions open or close the outlet portion of the hot gas duct connectable to the inlet of the second heat exchanger.

5. The thermodynamic system according to claim 3, wherein the selective closing element comprises a second heating valve disposed downstream of the compressor and connected to the controller so that the second heating valve is movable between open and closed positions to open or close the outlet portion of the hot gas duct connectable to the inlet of the third heat exchanger.

6. The thermodynamic system according to claim 1, wherein the temperature reducing device comprises a pressure reducing element and the regulating valve acts on a branch of the circuit parallel to the pressure reducing element to close or open the branch of the circuit parallel to the pressure reducing element.

7. The thermodynamic system according to claim 6, wherein the pressure reducing element is disposed along the return duct, upstream of the compressor, and the regulating valve and branch of the circuit parallel to the pressure reducing element are also disposed along the return duct, upstream of the compressor.

8. The thermodynamic system according to claim 6, wherein the controller is configured to drive the regulating valve into a configuration for closing the branch of the circuit parallel to the pressure reducing element to cool the compressor.

9. The thermodynamic system according to claim 1, wherein the temperature reducing device comprises a bypass duct which has an inlet portion connected to the outlet of the first heat exchanger to receive the heat exchanger fluid from the first heat exchanger and at least one outlet portion connected to the compressor inlet or inside the compressor.

10. The thermodynamic system according to claim 9, wherein the bypass duct has a first outlet portion connected inside the compressor to release at least a portion of the heat exchanger fluid flowing out of the bypass duct inside the compressor and a second outlet portion connected to an end portion of the return duct to release a portion of the heat exchanger fluid flowing out of the bypass duct at the compressor inlet.

11. The thermodynamic system according to claim 9, wherein the regulating valve is a bypass valve disposed in the bypass duct and connected to the controller so that the bypass valve is movable between open and closed positions to open or close the bypass duct in order to vary the flow of heat exchanger fluid in the bypass duct.

12. The thermodynamic system according to claim 1, wherein the measuring device comprises a temperature sensor and the triggering parameter is a temperature value detected near the compressor or inside the compressor.

13. The thermodynamic system according to claim 1, wherein the measuring device comprises a temperature sensor and the triggering parameter is a value of the temperature of the heat exchanger fluid at the outlet portion of the return duct connected to the compressor inlet.

14. The thermodynamic system according to claim 1, and further comprising a first cooling valve interposed between the second heat exchanger and the first heat exchanger and connected to the controller so that the first cooling valve is movable between open and closed positions to open or close the inlet of the second heat exchanger to perform a thermodynamic, inverse Carnot cycle.

15. The thermodynamic system according to claim 1, wherein the circuit further comprises a third heat exchanger which is thermally connectable with a second container of the liquid or semi-liquid food product, the third heat exchanger being disposed substantially parallel to the second heat exchanger between the first heat exchanger and the compressor.

16. The thermodynamic system according to claim 15, and further comprising a second expansion element including an outlet and an inlet disposed at the outlet of the first heat exchanger, and wherein the third heat exchanger has an inlet portion connected to the outlet of the second expansion element.

17. The thermodynamic system according to claim 15, and further comprising a second cooling valve interposed between the third heat exchanger and the first heat exchanger.

18. A machine for making liquid or semi-liquid food products, comprising:
the thermodynamic system according to claim 1,
a processing unit comprising the first container and a stirrer mounted inside the first container; to rotate inside the first container;
wherein the thermodynamic system is thermally connected with the processing unit, the second heat exchanger being thermally connected with the first container to exchange heat with the liquid or semi-liquid food product contained in the first container.

19. A method for thermally treating a liquid or semi-liquid food product, comprising:
A) providing a machine for making liquid or semi-liquid food products, the machine comprising:
a thermodynamic system for cooling or heating a first container containing a liquid or semi-liquid food product, comprising a circuit employing a heat exchanger fluid, including:
a compressor including a compressor inlet for the heat exchanger fluid and a compressor outlet for the heat exchanger fluid;
a first heat exchanger, having an outlet and an inlet, the inlet connected to the compressor outlet;
a first expansion element connected to the outlet of the first heat exchanger;
a second heat exchanger thermally connectable with the first container and which has an outlet and an inlet connected to an outlet of the first expansion element;
a return duct including an inlet portion connected to the outlet of the second heat exchanger and an outlet portion connected to the compressor inlet;
a temperature reducing device configured for reducing a temperature of the heat exchanger fluid, connectable with the circuit for receiving at least a portion of the heat exchanger fluid, including a device inlet and a device outlet, and configured to reduce the temperature of the heat exchanger fluid flowing between the device inlet and the device outlet, the device outlet being flowingly connected to the compressor inlet or inside the compressor;
a regulating valve configured for regulating the flow of the heat exchanger fluid traversing the temperature reducing device between a minimum flow configuration and a maximum flow configuration;
a controller operating on the regulating valve to drive the regulating valve;
wherein the controller includes a measuring device adapted to detect a triggering parameter, the controller being configured to control the regulating valve for regulating the flow of heat exchanger fluid traversing the temperature reducing device as a function of a value of the triggering parameter;
a processing unit comprising the first container and a stirrer mounted inside the first container; to rotate inside the first container;

wherein the thermodynamic system is thermally connected with the processing unit, the second heat exchanger being thermally connected with the first container to exchange heat with the liquid or semi-liquid food product contained in the first container;

placing the liquid or semi-liquid food product inside the first container;

B) turning on the compressor to convey the heat exchanger fluid along the circuit of the thermodynamic system of the machine to perform a thermodynamic cycle for transferring heat to or from the liquid or semi-liquid food product inside the first container;

C) regulating the flow in the temperature reducing device to a value greater than zero in order to cool the compressor.

* * * * *